June 15, 1926.

P. F. GODSTREY ET AL 1,589,069

PISTON

Filed Nov. 3, 1925

Inventor
Perceval Freeland Godstrey
and John W. Whiteside
By his Attorney
O. F. Kehoe Patented June 15, 1926.

1,589,069

UNITED STATES PATENT OFFICE.

PERCEVAL FREELAND GODSTREY AND JOHN W. WHITESIDE, OF NEW YORK, N. Y.

PISTON.

Application filed November 3, 1925. Serial No. 66,480.

This invention relates to improvements in pistons, and more particularly to gas engine pistons.

The main object of the invention is to provide an integral construction of piston which will avoid the necessity of removing the oil from the crank case, and also the crank case, eliminating the necessity of disconnecting the pitman, and thereby reduce the time and expense required in getting access to the piston, piston rings, bushing and wrist pin, when it is desired to examine, repair or renew such parts, by allowing this to be done through the head of the cylinder.

With these general objects in view, and others which will appear from the description hereinafter, the invention consists in the features, details of construction and combination of elements which will be fully described and more particularly pointed out in the description and claims.

In the drawings—

Figure 1:
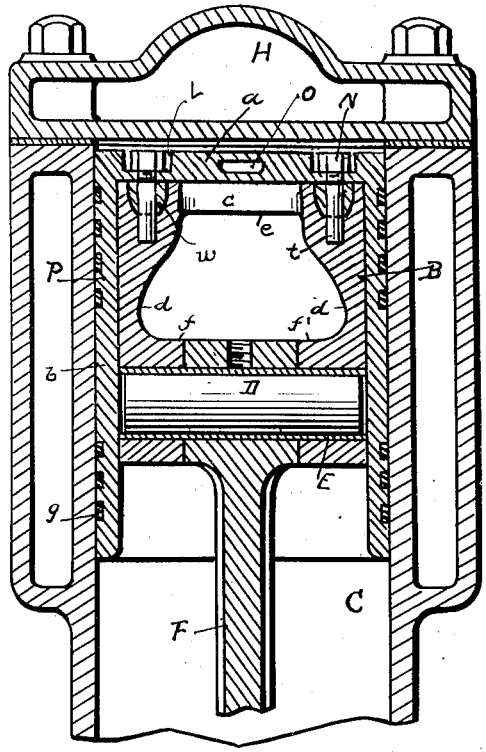
Fig. 1 is a vertical section of a piston embodying the features of the present invention.
Figure 2:
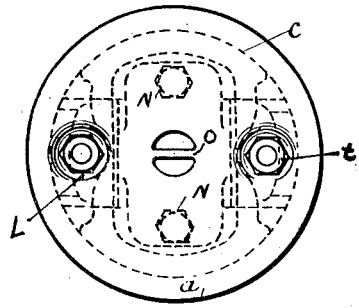
Fig. 2 is a top plan view of the same.

Referring to the drawings, P is the piston, the head $a$ and side wall, or skirt $b$, which are formed integrally, no provision being necessary for supporting the wrist pin D to said side wall or skirt. By such integral construction the possibility of lost compression is materially reduced by reason of the absence of any holes or brackets in the side wall or skirt of the piston, which was objectionable where slapping was caused through wear. The collection of carbon on the exterior of the piston, which causes knocks, is thereby minimized also. This construction reduces trouble also with the spark plugs, the oil being prevented from riding up the piston and getting on the points, on account of absence of joints and wrist pin holes. The piston is provided with the usual piston rings $g$.

Figure 3:
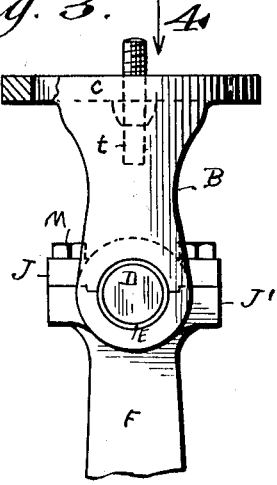
Fig. 3 is a side elevation of the cradle element.
Figure 4:
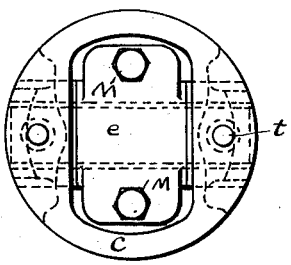
Fig. 4 is a top plan view of the same.

The cradle element, B, which may be made of aluminite or other suitable material capable of withstanding the necessary heat and strain, at its upper end is provided with a table $c$ having a large opening $e$ preferably of elliptical shape and transversely of the wrist pin for a purpose hereinafter described, from opposite sides of which table depend two legs $d$, which, for convenience of manufacture and strength, will be advantageously formed in one piece with table $c$. Each of these legs, which are of sufficient thickness to retain bolts $t$ cast or otherwise suitably secured therein, in the best constructions, has formed at the end thereof bosses $f$ $f'$ each of which has a bore to register with each other adapting them to receive wrist pin D which may be secured therein in any suitable manner, as by swaging. The upper ends of these legs are of considerable width to give necessary strength. It may be of advantage to similarly interpose a bushing E in said bosses $f$ $f'$, which bosses are turned in opposite directions as shown (Fig. 1). There is sufficient space between bosses $f$ and $f'$ formed on legs $d$, $d'$ to admit of the interposition of split bearing J for connecting the pitman F with the piston P through the cradle B (Fig. 3).

The piston P is encased in the usual cylinder C having usual head H. The piston head $a$ is provided with two holes in such position that they will register with the bolts $t$ formed, for convenience and strength, in the table $c$ so they will extend into legs $d$ of the cradle B permitting said cradle B to be secured to said piston by tightening nuts N on bolts $t$ after the latter have been positioned in the holes, and the piston is then drawn down to the cradle B. The cradle has a tight fit in the piston, which it thus aids in strengthening, and, since in this construction the wrist pin does not project through the piston, it is impossible for the sides of the cylinder to be scored. Since the weight is all on the piston head, the strain will be slight.

The pitman or crank rod F is secured to the wrist pin D and bushing E through split bearing J, J' between the bosses $f$, $f'$ of cradle legs $d$, $d'$ by means of bolts M which are suitably secured, as by casting, in the lower part J of said split bearing and held in position by nuts which nuts may be readily removed by a wrench or other suitable tool being applied through opening $e$ in the table of cradle B after the head H has been taken off and the piston P removed from the cylinder. The bolts $t$ are cast in the table and the legs of the cradle in order to give the necessary strength and to permit the cradle to be satisfactorily secured to the piston head and furnish sufficient in addition. A countersunk portion L is formed in the piston head of such size that it will give sufficient clearance for permitting the insertion of a wrench to loosen the nuts, to enable the ready removal of the piston P from the cylinder through the use of any suitable hooked tool and also allow the piston head to come up close to the engine or cylinder head at the end of the compression stroke, but not to contact therewith.

In order to attain a more satisfactory register, and greater stability, between the cradle and bottom of the piston head, lugs W are cast on the latter which take into depressions in the former (Fig. 1).

An oil hole is provided in the upper part J of the split bearing and, it will be of advantage to have this hole screw threaded to permit of the insertion of a screw threaded tool to aid in the separation of the two parts J, J' of the split bearing in case they should become stuck together and cannot be readily separated.

It will thus be observed that by the present invention a construction is provided that will not only avoid the necessity of removing the oil from the crank case and also the crank case with its attendant loss of time and materials but that the operations necessary to reach, remove and replace the piston, rings, wrist pin and wrist pin bushing are very much expedited, and so simplified that they readily may be performed by an unskilled person. It will also be observed that there will be an increase in power through greater stability of action and steadiness of the piston due to the lack of wear on the wrist pin and consequent reduction in slap of the piston; and also, through reduction of carbon collecting on the piston, cylinder head, valves, and spark plugs, the compression will be materially increased; these consequently producing a material increase in mileage.

The operation of the device is as follows:

When it is desired to obtain access to the piston, bushing, piston rings or wrist pin, the engine will be first turned over until it reaches the end of the compression stroke, when the head of the piston is close to the head of the engine, then the cylinder head is removed. To free the cradle from the piston, unscrew each of the nuts N on each of the bolts $t$ when, by inserting under the grip O in the piston head any suitable hooked tool, or two straight pieces of metal inserted from opposite sides, the piston may be pulled out, together with the rings thereon. After the piston has been removed from the cylinder the two nuts on the upper ends of the bolts M which secure the pitman to the wrist pin will be removed by inserting a wrench or other suitable tool through the opening $e$ in the table $c$ of the cradle, being careful not to drop the nuts. The bolts M will not drop down because they are prevented from falling by the manner in which they are secured to the bottom of the split bearing. The upper part of this split bearing is then taken out. If the upper part of the split bearing should be stuck and not readily removable by a few taps of the hammer, any suitable screw threaded tool may be inserted into the oil hole in its top, and this part can then be readily pulled out. The cradle, with wrist pin and bushing, can then be lifted out, using the sides or ends of opening $e$ in the cradle table as grip surfaces.

What we claim is:

1. In a piston, the combination with a shell having integral head and side walls, of an element removably secured to said head wall and adapted to be removed through the cylinder head, bolts embedded in said element and depressions therein for receiving lugs on said head wall, said element being also adapted to removably support, and give access to, a wrist pin.

2. In a piston, the combination with a shell having integral head and side walls, of an element removably secured to said head wall and adapted to be removed through the cylinder head, bolts embedded in said element, and depressions therein for receiving lugs on said head wall, said element having an opening in its table, and adapted to removably support a wrist pin.

3. In a piston, the combination with a shell having integral head and side walls, said head wall having countersunk portions and lugs, of an element removably secured to said head wall and adapted to be removed through the cylinder head, bolts embedded in said element, and depressions therein for receiving said lugs, said element having an opening in its table to give access to a removably supported wrist pin.

PERCEVAL FREELAND GODSTREY.
JOHN W. WHITESIDE.